J. Baker,
Cherry Stoner,
N°. 19,476.                    Patented Mar. 2, 1858.
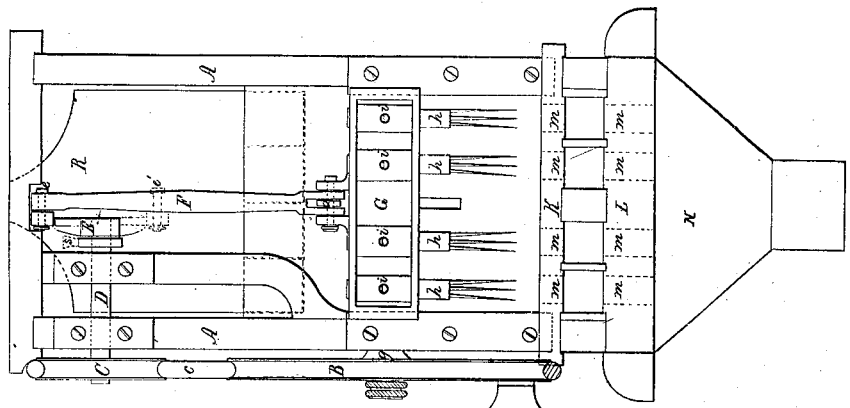
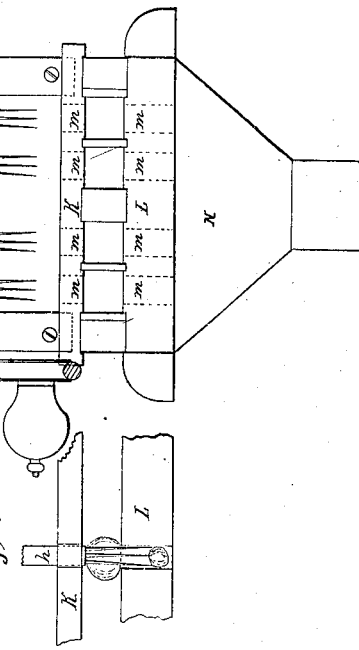
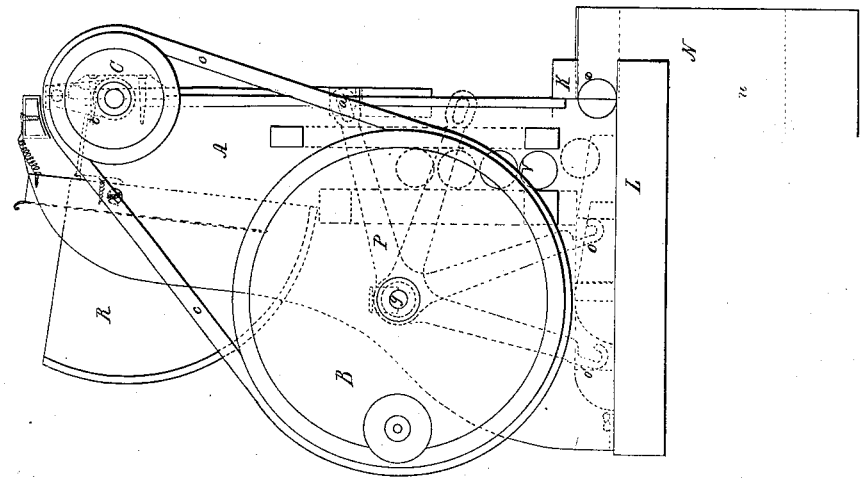

UNITED STATES PATENT OFFICE.

JOSEPH BAKER, OF WASHINGTON, DISTRICT OF COLUMBIA.

MACHINE FOR STONING CHERRIES.

Specification of Letters Patent No. 19,476, dated March 2, 1858.

*To all whom it may concern:*

Be it known that I, JOSEPH BAKER, of Washington, in the District of Columbia, have invented a new and useful Machine for Stoning Cherries; I do hereby declare that the following is a full, clear, and exact description of the construction and operation of the same, reference being had to the annexed drawings and to letters marked thereon.

Figure 1, is a side view, Fig. 2, a front view. A, frame of the machine; B, driving wheel; C, driven wheel, connected with shaft D; E, crank on shaft; F, connecting rod; c, driving strap; G crosshead; H perforators; i, i, i, i, screws to confine and adjust perforators in the crosshead; K, stop above the fruit, to prevent its being drawn up on the perforators after the stones are extracted; L stop below the first, with apertures in, through which the stones are driven, the apertures are made sufficiently large to allow the stones to pass through but not the pulp of the fruit; m, m, m, m, apertures made sufficiently large for perforators to pass freely through. N, funnel in front, divided into two parts, as shown in the side view by the line marked, u, to separate the stones from the pulp after extraction by the perforators, the pulp drops over the front of the machine, while the stone passes through apertures m, m. O feeding slide, showing its position at the time it has propelled the fruit from under the pipes V, to the proper position under the perforators. The feeding slide is slightly beveled from heel to point, to relieve the fruit from unnecessary friction, on its return from under the pipes, and thereby prevent its being crushed. o shows the relative position of feeding slide and crosshead, with perforators when said slide is withdrawn from under the pipe; P lever linked in the crosshead at a, and centered on shaft g; the said lever communicating motion to feeding slide when the crosshead is put in motion; R, shaking hopper that contains the fruit, suspended by screws at x; s, projection or arm on hopper R, motion being communicated to the same by tappet, t, on the crankshaft, D. The perforators are constructed by setting three or more points around or within the periphery of a circle, the said points terminating in a plane at the base.

Fig. 3, a section of stop and detached perforator, showing more clearly the operation of extracting the stone from the fruit.

Operation: Suppose the fruit to be placed in the hopper R, and the wheel B, to be turned, motion will be communicated to the wheel C, by the connecting band c, and consequently to the crank shaft D, upon which tappet ($t$,) is placed; the tappet acting upon the projecting arm ($s$) communicates motion to the hopper, and shakes the fruit down the pipes V, to be pushed forward by the feeding slide O, when the crosshead G, rises, the feeding slide being acted on by bent lever P, and propelled alternately backward and forward by the same, as follows: When the crosshead G, rises, the slide O, propels the fruit under the perforators, and upon the descent of the crosshead G, the perforators extract the stone from the fruit, and the slide O, is propelled back to position, (as shown by dotted figure $o'$) and the pulp or fruit falls in front of said slide to be acted on, and pushed forward upon the crosshead G, again ascending.

What I claim as my invention, and desire to secure by Letters Patent, is—

1. The perforator, h, by which the stone is extracted from the pulp of the fruit, and the beveled feeding slide, O.

2. I also claim, the combination of perforators h, the bent lever P, and feeding slide O, operated and arranged in relation to each other as described, and for the purpose specified.

JOSEPH BAKER.

Witnesses:
M. F. CARSEN,
DAVID WANDLING.